US010116840B2

(12) United States Patent
Cha et al.

(10) Patent No.: US 10,116,840 B2
(45) Date of Patent: Oct. 30, 2018

(54) ARRAY CAMERA, ELECTRICAL DEVICE, AND METHOD FOR OPERATING THE SAME

(71) Applicant: LG ELECTRONICS INC., Seoul (KR)

(72) Inventors: Young Ho Cha, Seoul (KR); Kyu Yeol Chae, Seoul (KR); Salk Mann Ji, Seoul (KR)

(73) Assignee: LG ELECTRONICS INC., Seoul (KR)

(*) Notice: Subject to any disclaimer, the term of this patent is extended or adjusted under 35 U.S.C. 154(b) by 227 days.

(21) Appl. No.: 14/646,672

(22) PCT Filed: Sep. 16, 2013

(86) PCT No.: PCT/KR2013/008374
§ 371 (c)(1),
(2) Date: May 21, 2015

(87) PCT Pub. No.: WO2014/081115
PCT Pub. Date: May 30, 2014

(65) Prior Publication Data
US 2015/0312445 A1    Oct. 29, 2015

(30) Foreign Application Priority Data

Nov. 26, 2012 (KR) .................. 10-2012-0134703

(51) Int. Cl.
H04N 7/18 (2006.01)
H04N 5/222 (2006.01)
(Continued)

(52) U.S. Cl.
CPC ......... *H04N 5/2226* (2013.01); *G06F 1/1626* (2013.01); *G06T 7/20* (2013.01);
(Continued)

(58) Field of Classification Search
CPC .. G06F 1/1626; H04N 5/2226; H04N 5/2258; H04N 5/23206; H04N 5/23216;
(Continued)

(56) References Cited

U.S. PATENT DOCUMENTS

2006/0125921 A1* 6/2006 Foote .................... G06T 3/4038
348/159
2007/0132846 A1* 6/2007 Broad ................... G08B 25/009
348/143
(Continued)

FOREIGN PATENT DOCUMENTS

JP    2008172523    7/2008
JP    2008286527    11/2008
(Continued)

OTHER PUBLICATIONS

PCT International Application No. PCT/KR2013/008374, Written Opinion of the International Searching Authority dated Jan. 28, 2014, 3 pages.
(Continued)

Primary Examiner — Sathyanaraya V Perungavoor
Assistant Examiner — Peet Dhillon
(74) Attorney, Agent, or Firm — Lee, Hong, Degerman, Kang & Waimey

(57) ABSTRACT

Disclosed are an array camera, an electrical device, and a method for operating the same. A method for operating an array camera including a plurality of camera modules includes acquiring images through the camera modules, when a first object is located at a first position of a first distance, extracting a first image and a second image acquired by a first camera module and a second camera module selected from among the camera modules, respectively, calculating distance information regarding the first object based on the first image and the second image, and
(Continued)

when a second object is located at a second position or a second distance, calculating distance information regarding the second object located at the second position or the second distance based on at least one of a third image acquired by a camera module different from the first camera module and a fourth image acquired by a camera module different from the second camera module. Consequently, user convenience is improved.

16 Claims, 13 Drawing Sheets

(51) Int. Cl.
| | | |
|---|---|---|
| H04N 13/10 | (2018.01) | |
| H04N 13/243 | (2018.01) | |
| H04N 5/225 | (2006.01) | |
| H04N 5/232 | (2006.01) | |
| G06F 1/16 | (2006.01) | |
| G06T 7/20 | (2017.01) | |
| H04N 5/247 | (2006.01) | |
| H04N 13/373 | (2018.01) | |
| H04N 7/14 | (2006.01) | |
| H04N 13/00 | (2018.01) | |

(52) U.S. Cl.
CPC ....... *H04N 5/2258* (2013.01); *H04N 5/23206* (2013.01); *H04N 5/23216* (2013.01); *H04N 5/247* (2013.01); *H04N 13/10* (2018.05); *H04N 13/243* (2018.05); *H04N 13/373* (2018.05); *G06T 2207/10012* (2013.01); *G06T 2207/10021* (2013.01); *G06T 2207/10148* (2013.01); *G06T 2207/20221* (2013.01); *H04N 7/144* (2013.01); *H04N 2007/145* (2013.01); *H04N 2013/0081* (2013.01)

(58) Field of Classification Search
CPC ........... H04N 13/0242; H04N 13/0475; H04N 7/144; H04N 2007/145; H04N 2013/0081; H04N 5/247; H04N 13/0003
USPC ........................................................ 348/149
See application file for complete search history.

(56) References Cited

U.S. PATENT DOCUMENTS

| | | | |
|---|---|---|---|
| 2008/0246840 A1 | 10/2008 | Larson et al. | |
| 2008/0303919 A1* | 12/2008 | Egawa | G06T 1/0007 348/223.1 |
| 2011/0109748 A1 | 5/2011 | Lee et al. | |
| 2012/0176481 A1* | 7/2012 | Lukk | H04N 13/0011 348/47 |
| 2012/0188391 A1 | 7/2012 | Smith | |
| 2012/0188420 A1 | 7/2012 | Black et al. | |

FOREIGN PATENT DOCUMENTS

| | | |
|---|---|---|
| JP | 2011149931 | 8/2011 |
| JP | 2012007906 | 1/2012 |

OTHER PUBLICATIONS

Korean Intellectual Property Office Application Serial No. 10-2012-0134703, Office Action dated Jul. 11, 2018, 8 pages.

* cited by examiner

[Fig. 1]
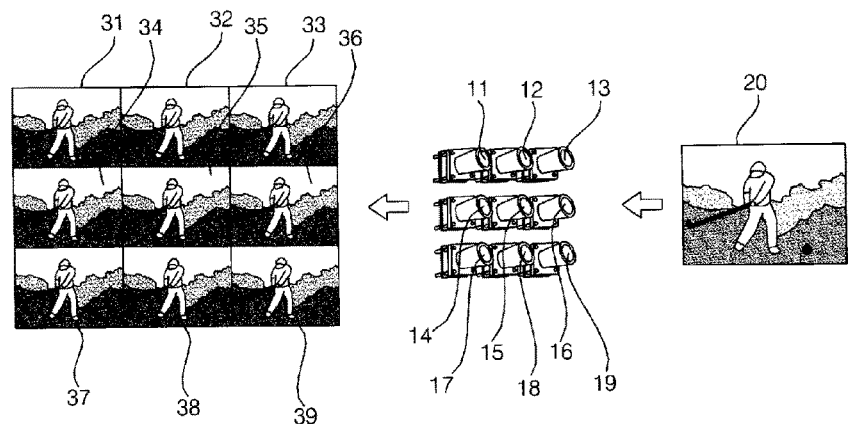
[Fig. 2]
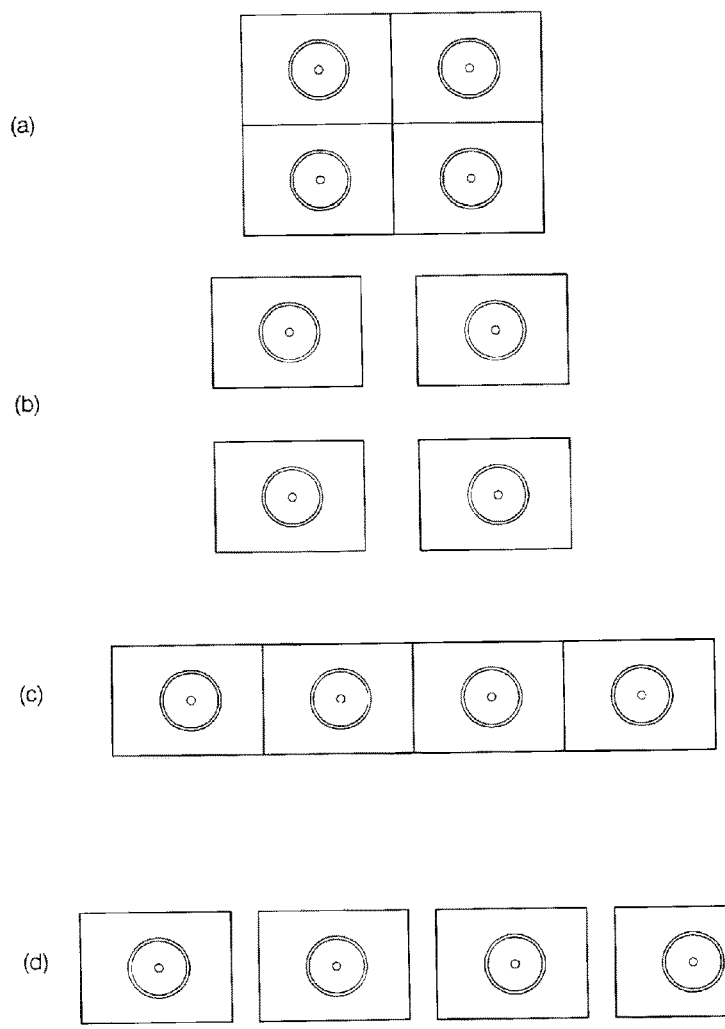
(a)
(b)
(c)
(d)

[Fig. 3]
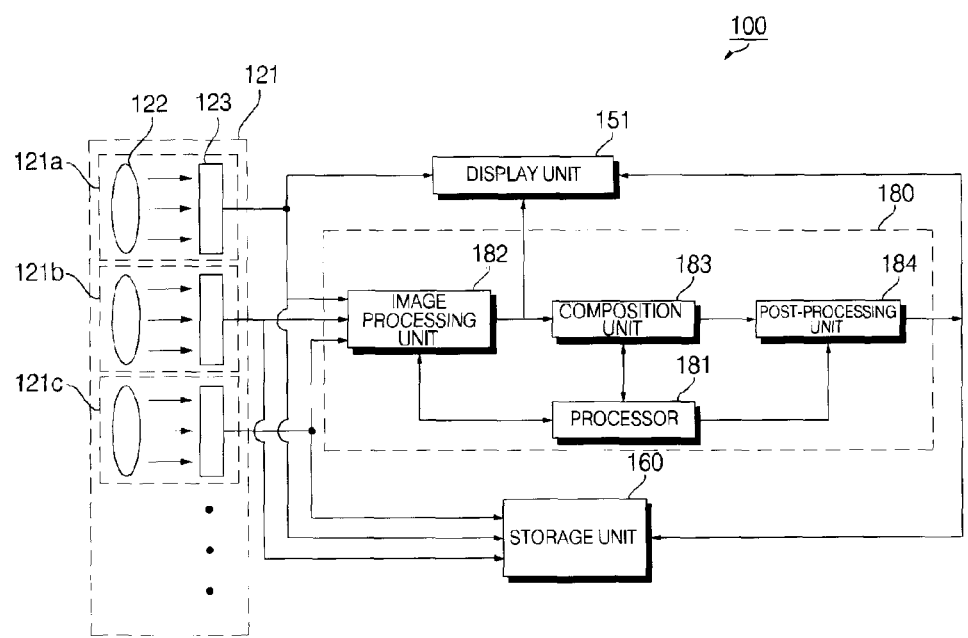

[Fig. 4]
(a) 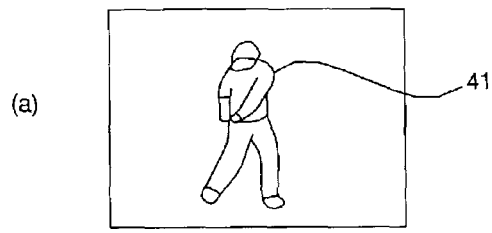
(b) 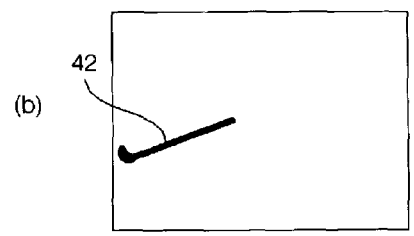
(c) 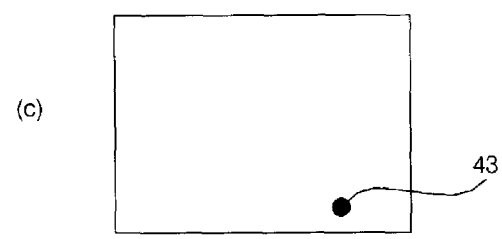
(d) 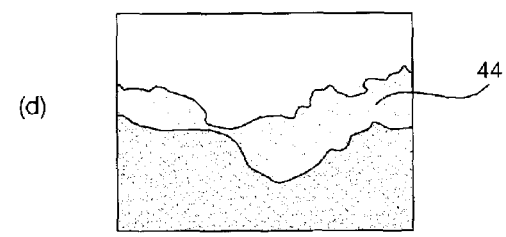

[Fig. 5]
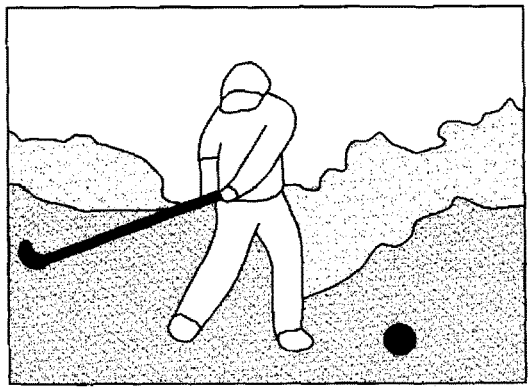
[Fig. 6]
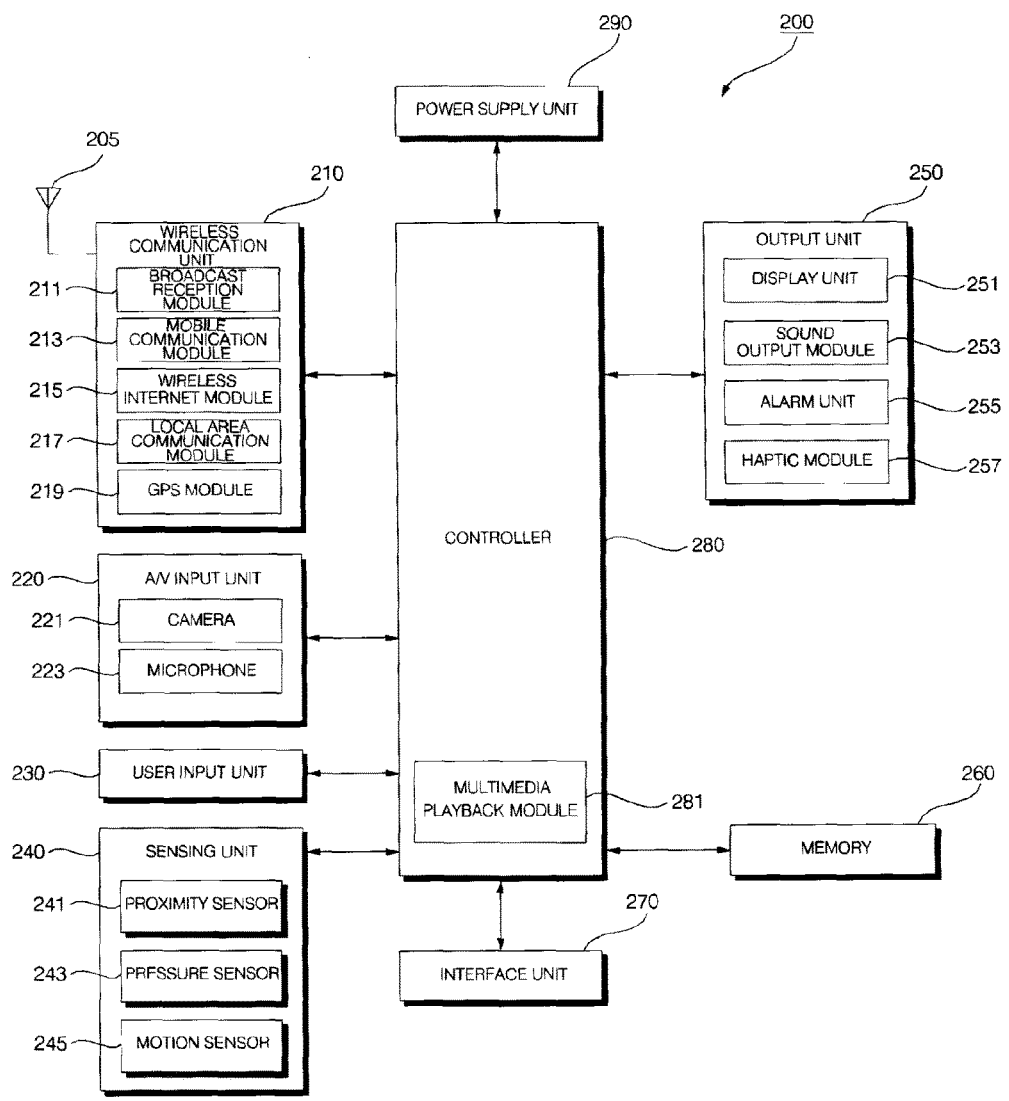

[Fig. 7]
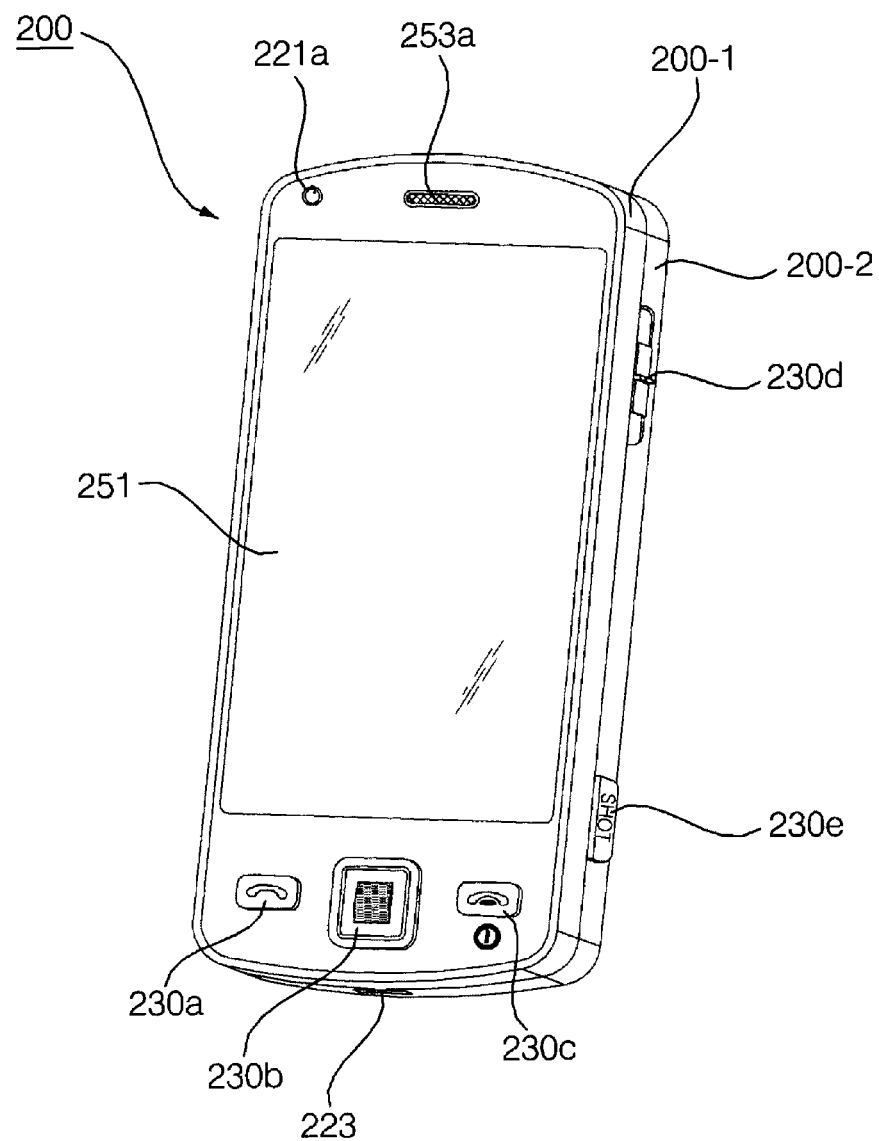

[Fig. 8]
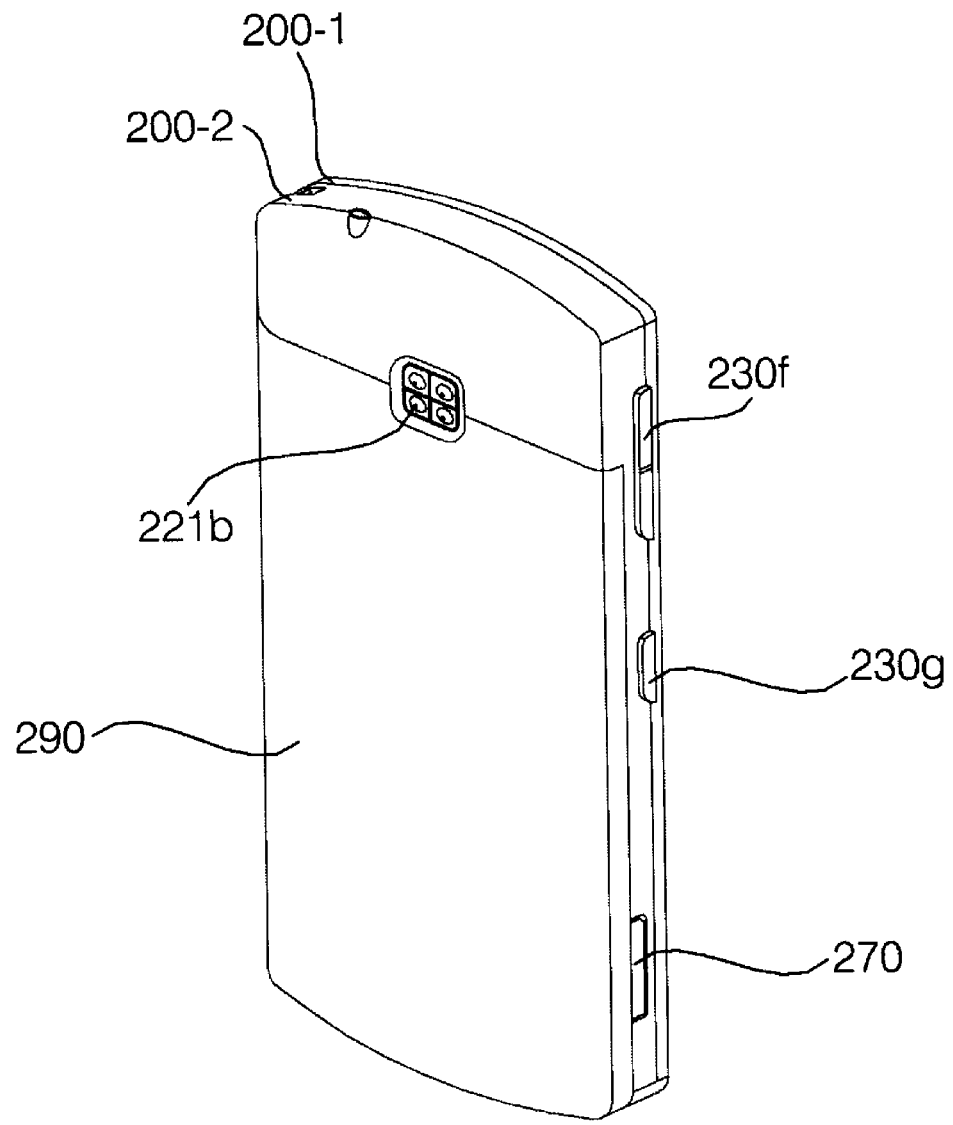

[Fig. 9]
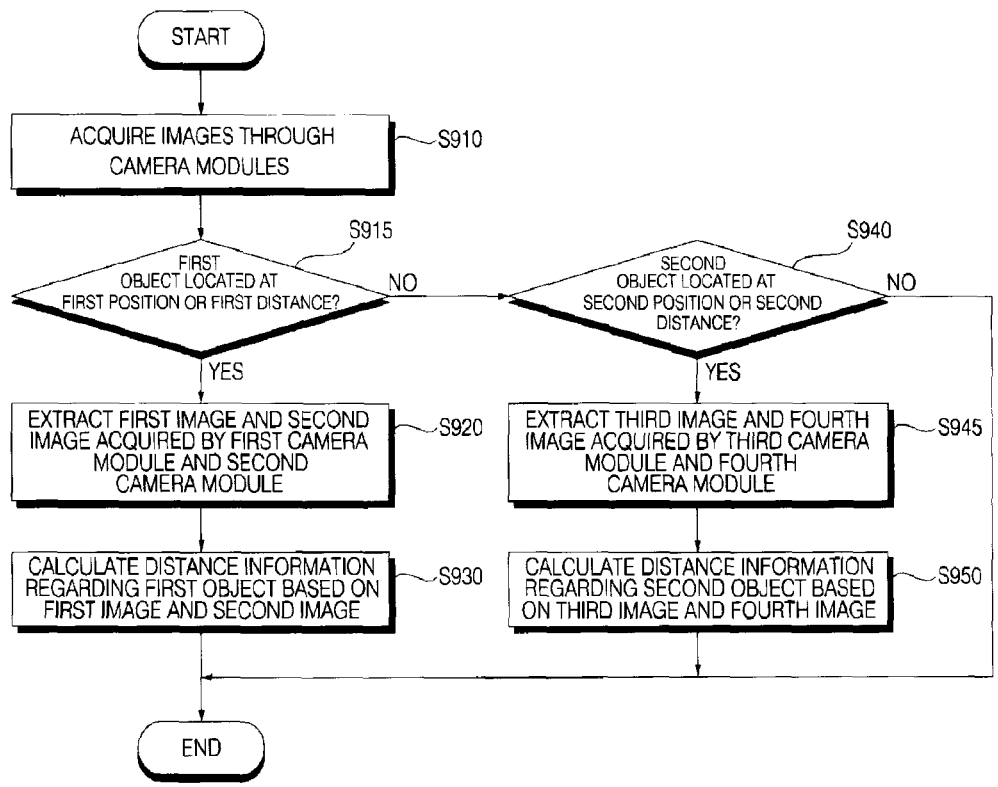
[Fig. 10a]
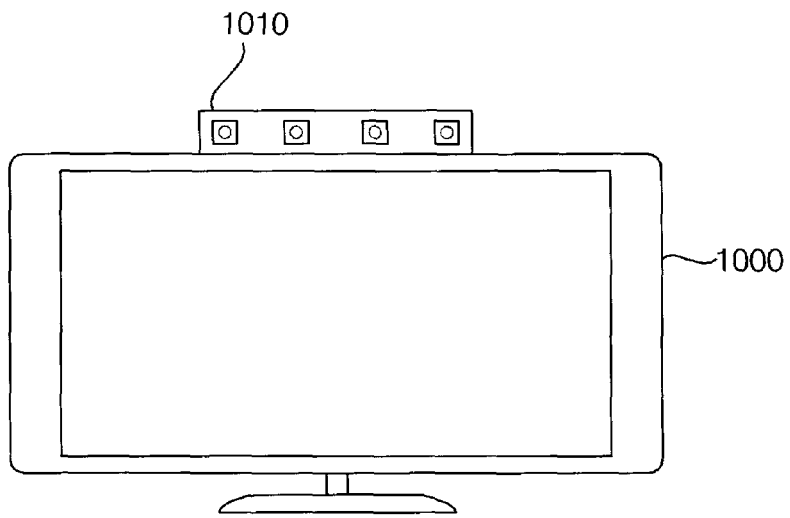

[Fig. 10b]
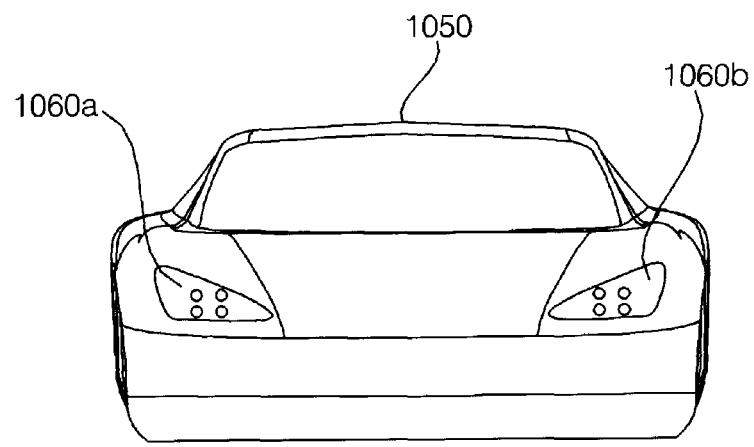
[Fig. 11a]
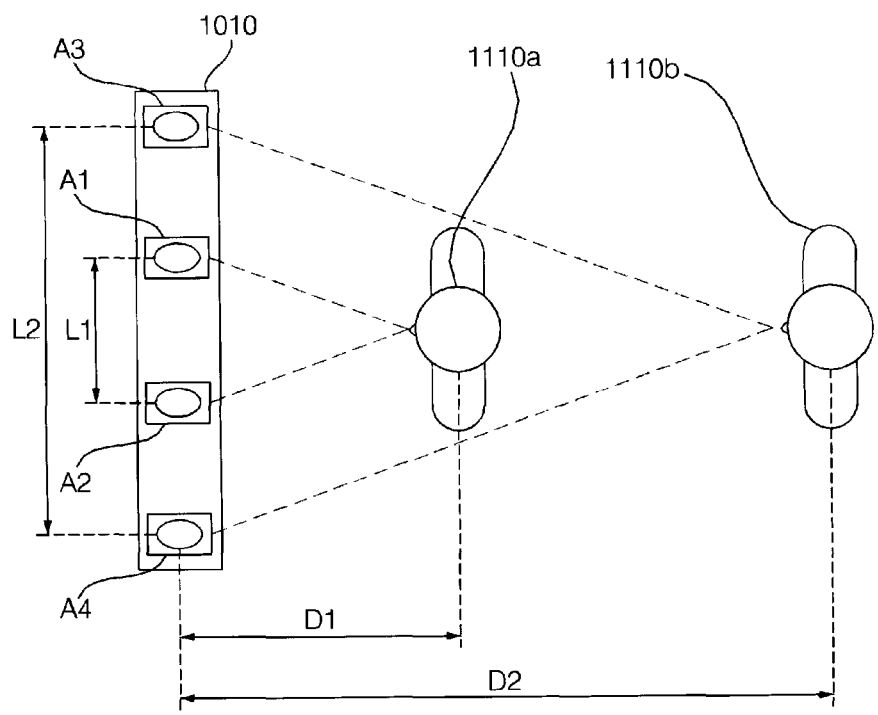

[Fig. 11b]
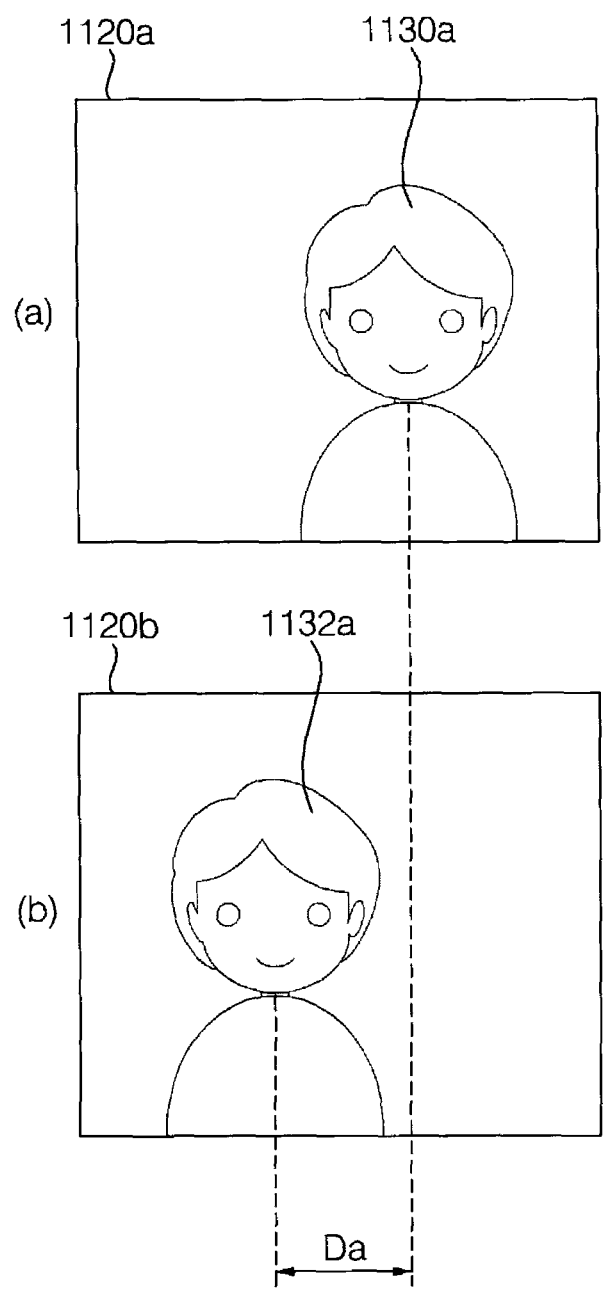

[Fig. 11c]
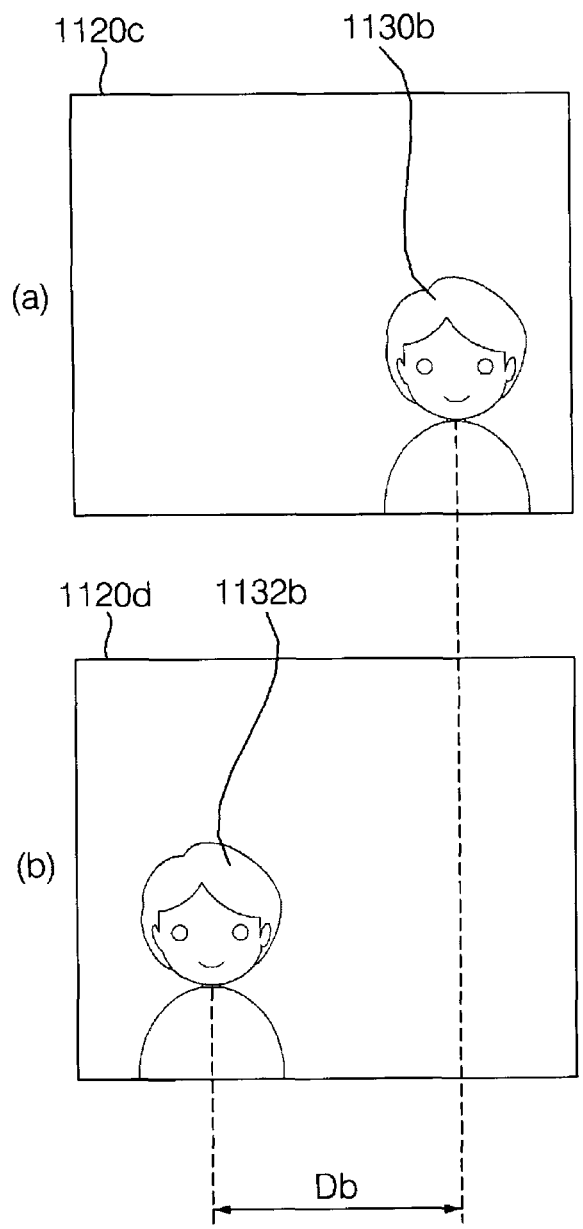

[Fig. 12a]
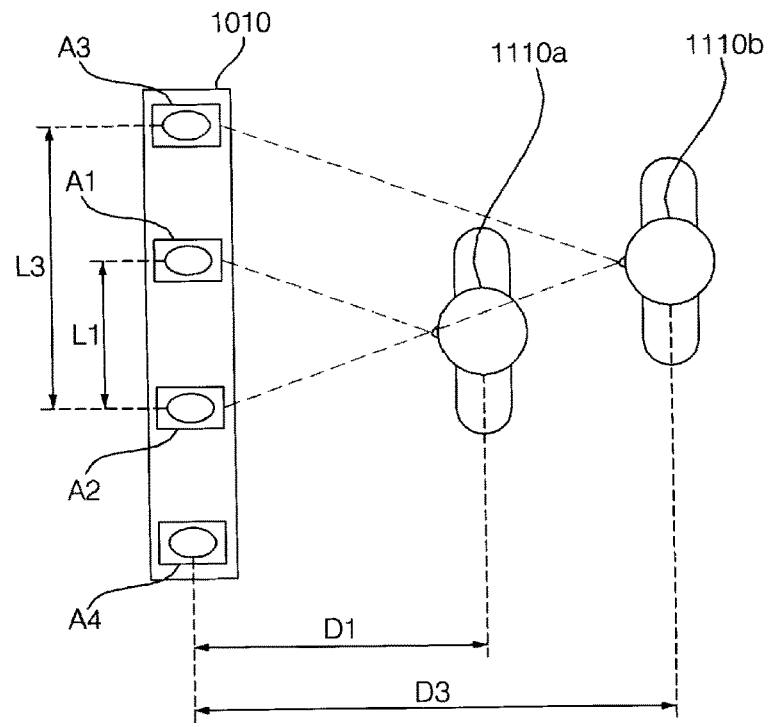
[Fig. 12b]
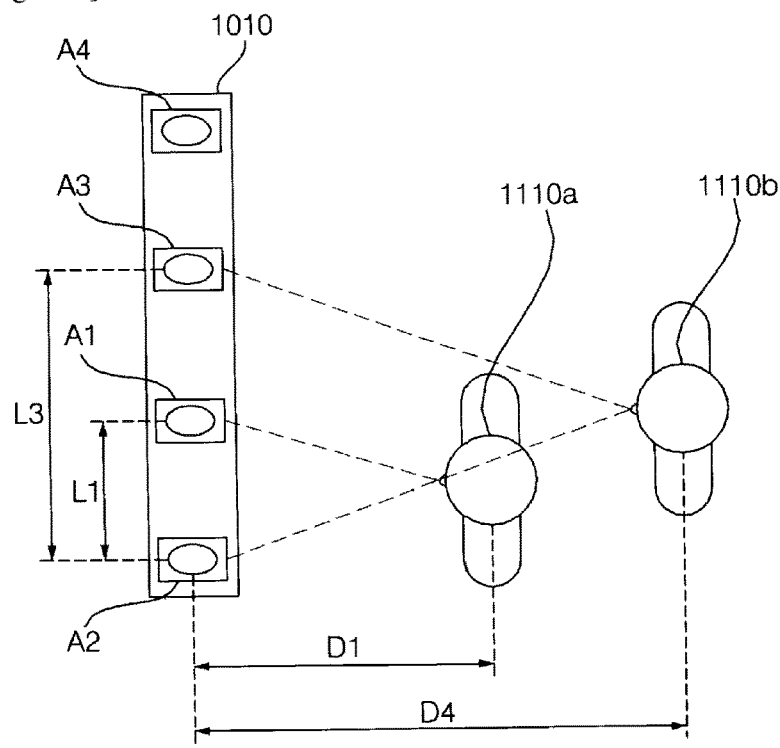

[Fig. 12c]
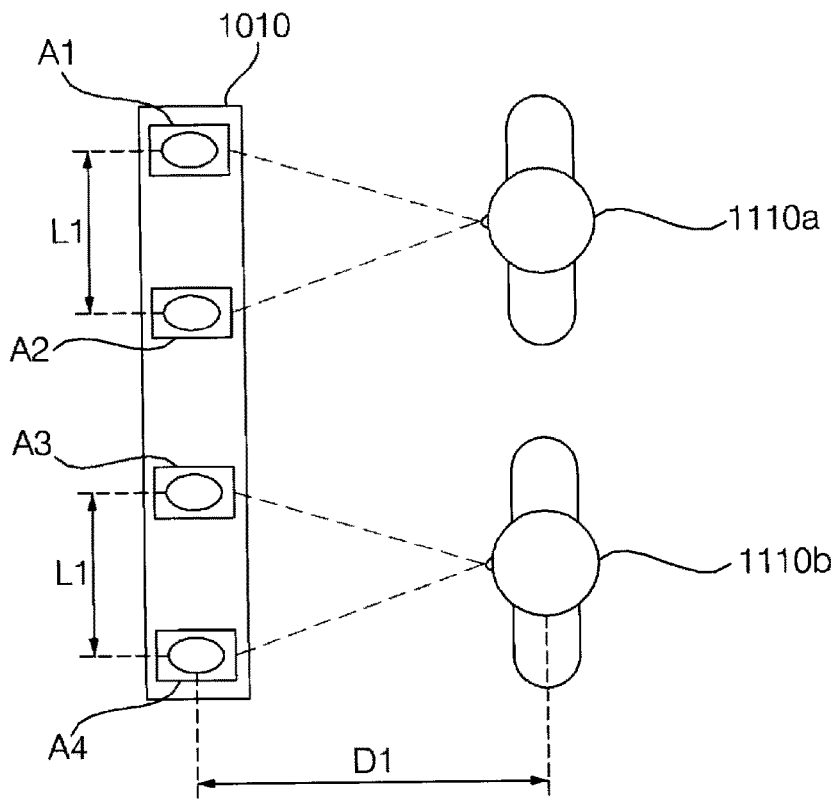
[Fig. 13]
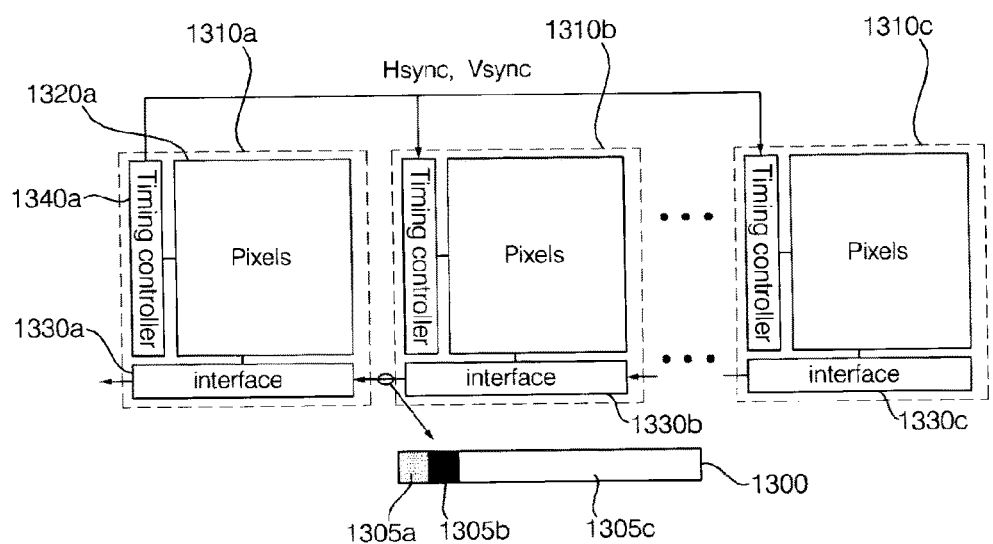

[Fig. 14]
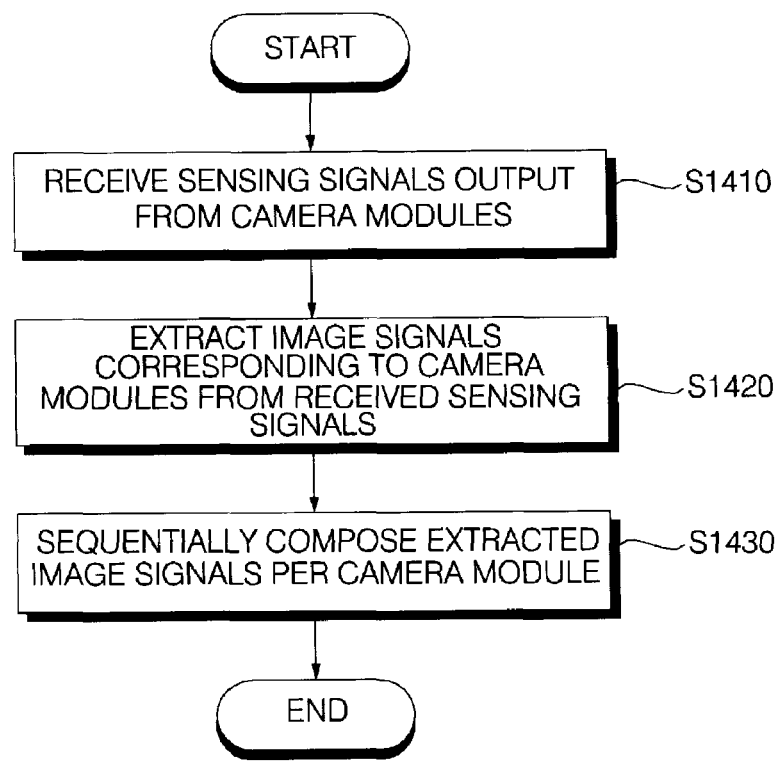

ARRAY CAMERA, ELECTRICAL DEVICE, AND METHOD FOR OPERATING THE SAME

CROSS-REFERENCE TO RELATED APPLICATIONS

This application is the National Stage filing under 35 U.S.C. 371 of International Application No. PCT/KR2013/008374, filed on Sep. 16, 2013, which claims the benefit of earlier filing date and right of priority to Korean Application No. 10-2012-0134703, filed on Nov. 26, 2012, the contents of which are all hereby incorporated by reference herein in their entirety.

TECHNICAL FIELD

The present invention relates to an array camera, an electrical device, and a method for operating the same and, more particularly, to an array camera and a method for operating the same and a mobile terminal including an array camera and a method for operating the same.

BACKGROUND ART

A camera that photographs a subject to acquire predetermined images, such as video or still images, has been gradually miniaturized and provided in a digital device, such as a mobile terminal, a personal digital assistant (PDA), a laptop computer, and an image display device.

With miniaturization and slimming of the camera, research has been increasingly conducted into a method of acquiring and restoring high-quality images.

DISCLOSURE OF INVENTION

Technical Problem

It is an object of the present invention to provide an array camera, an electrical device, and a method for operating the same that improve user convenience.

It is another object of the present invention to provide an array camera, an electrical device, and a method for operating the same that measure the distance from an external object.

Solution to Problem

In accordance with one aspect of the present invention, the above and other objects can be accomplished by the provision of a method for operating an array camera including a plurality of camera modules, the method including acquiring images through the camera modules, when a first object is located at a first position or a first distance, extracting a first image and a second image acquired by a first camera module and a second camera module selected from among the camera modules, respectively, calculating distance information regarding the first object based on the first image and the second image, and when a second object is located at a second position or a second distance, calculating distance information regarding the second object located at the second position or the second distance based on at least one of a third image acquired by a camera module different from the first camera module and a fourth image acquired by a camera module different from the second camera module.

In accordance with another aspect of the present invention, there is provided a method for operating an array camera including a plurality of camera modules, the method including receiving sensing signals output from the respective camera modules, extracting image signals corresponding to the respective camera modules from the received sensing signals, and sorting the extracted image signals per camera module and sequentially composing the sorted image signals.

In accordance with another aspect of the present invention, there is provided a method for operating an electrical device having an array camera including a plurality of camera modules, the method including acquiring images through the camera modules, when a first object is located at a first position or a first distance, extracting a first image and a second image acquired by a first camera module and a second camera module selected from among the camera modules, respectively, calculating distance information regarding the first object based on the first image and the second image, and when a second object is located at a second position or a second distance, calculating distance information regarding the second object located at the second position or the second distance based on at least one of a third image acquired by a camera module different from the first camera module and a fourth image acquired by a camera module different from the second camera module.

In accordance with another aspect of the present invention, there is provided an array camera including a plurality of camera modules, an image processing unit to image signal process images acquired by the respective camera modules, and a processor to, when a first object is located at a first position or a first distance, extract a first image and a second image acquired by a first camera module and a second camera module selected from among the camera modules, respectively, and to calculate distance information regarding the first object based on the first image and the second image and to, when a second object is located at a second position or a second distance, calculate distance information regarding the second object located at the second position or the second distance based on at least one of a third image acquired by a camera module different from the first camera module and a fourth image acquired by a camera module different from the second camera module.

In accordance with a further aspect of the present invention, there is provided an electrical device including a plurality of camera modules, an image processing unit to image signal process images acquired by the respective camera modules, and a processor to, when a first object is located at a first position or a first distance, extract a first image and a second image acquired by a first camera module and a second camera module selected from among the camera modules, respectively, and to calculate distance information regarding the first object based on the first image and the second image and to, when a second object is located at a second position or a second distance, calculate distance information regarding the second object located at the second position or the second distance based on at least one of a third image acquired by a camera module different from the first camera module and a fourth image acquired by a camera module different from the second camera module.

Advantageous Effects of Invention

According to an embodiment of the present invention, an array camera including a plurality of camera modules acquires images through the camera modules and calculates the distance from an object using the image acquired by a corresponding one of the camera modules based on the position of the object or the distance from the object. Consequently, the distance from the object may be conveniently and correctly confirmed, thereby improving user convenience.

In particular, it is determined by which camera module an image, which will be used, has been photographed based on the position of the object or the distance from the object. Consequently, the distance from the object may be properly confirmed.

Meanwhile, in a case in which a plurality of camera modules is used, sensing signals output from the respective camera modules may be input to one of the camera modules. Consequently, the respective sensing signals may be efficiently managed.

In this case, the sensing signals may include synchronization information and identifier information to distinguish between the respective sensing signals. Consequently, the respective sensing signals may be simply distinguished.

BRIEF DESCRIPTION OF DRAWINGS

The above and other objects, features and other advantages of the present invention will be more clearly understood from the following detailed description taken in conjunction with the accompanying drawings, in which:

FIG. 1 is a view illustrating an array camera according to an embodiment of the present invention and a method for operating the same;

FIG. 2 is a view schematically showing various configuration examples of the array camera according to the embodiment of the present invention;

FIG. 3 is a block diagram of an array camera according to another embodiment of the present invention;

FIGS. 4 and 5 are views illustrating a method for operating the array camera of FIG. 3;

FIG. 6 is a block diagram of a mobile terminal according to an embodiment of the present invention;

FIG. 7 is a front perspective view of the mobile terminal according to the embodiment of the present invention;

FIG. 8 is a rear perspective view of the mobile terminal according to the embodiment of the present invention;

FIG. 9 is a flowchart showing the method for operating the array camera according to the embodiment of the present invention;

FIGS. 10a to 13 are views illustrating various examples of the method for operating the mobile terminal of FIG. 9; and FIG. 14 is a flowchart showing a method for operating an array camera according to another embodiment of the present invention.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

An electrical device as described in this specification is a device in which array camera modules may be mounted. The electrical device may include an image display device, such as a mobile terminal, a television, or a monitor, an image processing device, such as a settop box, and a vehicle, such as an automobile or a bicycle. Hereinafter, the electrical device will be described in terms of an image display device having a display unit.

Meanwhile, the mobile terminal may include a mobile phone, a smartphone, a laptop computer, a digital broadcasting terminal, a personal digital assistant (PDA), a portable multimedia player (PMP), a camera, a navigation system, a tablet computer, and an electronic book (e-book) terminal.

The terms "module" and "unit," when attached to the names of components are used herein to aid in the understanding of the components and thus they should not be considered as having specific meanings or roles. Accordingly, the terms "module" and "unit" may be used interchangeably.

FIG. 1 is a view illustrating an array camera 10 according to an embodiment of the present invention and a method for operating the same.

The array camera 10 may include a plurality of camera modules 11, 12, 13, 14, 15, 16, 17, 18, and 19. The camera modules 11, 12, 13, 14, 15, 16, 17, 18, and 19 may be arranged in a matrix of M×N (M and N being integers equal to or greater than 1).

The array camera 10 may photograph a predetermined subject using the camera modules 11, 12, 13, 14, 15, 16, 17, 18, and 19, which may be independently controlled and may be independently photograph the subject, to acquire still images and video data.

For example, when a predetermined subject 20 is photographed using the array camera 10, the camera modules 11, 12, 13, 14, 15, 16, 17, 18, and 19 may photograph the same subject 20 at the same time or at predetermined time intervals to acquire a plurality of still images 31, 32, 33, 34, 35, 36, 37, 38, and 39.

In addition, the array camera 10 may compose the acquired still images 31, 32, 33, 34, 35, 36, 37, 38, and 39 using at least one of various image composition algorithms to generate a composite image of higher quality.

In the example shown in FIG. 1, the array camera 10 includes nine camera modules arranged in a matrix of 3×3. However, embodiments of the present invention are not limited thereto. For example, the number and arrangement of the camera modules included in the array camera 10 may be variously changed.

FIG. 2 is a view schematically showing various configuration examples of the array camera according to the embodiment of the present invention. More specifically, in a case in which the array camera includes four camera modules, the camera modules may be variously arranged as shown in FIG. 2.

FIG. 2(a) shows an example in which the four camera modules are arranged in a matrix of 2×2 and FIG. 2(b) shows an example in which the four camera modules are arranged in a matrix of 2×2 but the respective camera modules are arranged at predetermined intervals.

FIG. 2(c) shows an example in which the four camera modules are arranged in a matrix of 1×4 and FIG. 2(d) shows an example in which the four camera modules are arranged in a matrix of 1×4 but the respective camera modules are arranged at predetermined intervals.

Although not shown in FIG. 2, the four camera modules are arranged in a matrix of 4×1.

FIG. 3 is a block diagram of an array camera 100 according to another embodiment of the present invention and FIGS. 4 and 5 are views illustrating a method for operating the array camera of FIG. 3.

Configuration of the array camera 100 will be described with reference to FIG. 3 in terms of components related to image acquisition and processing. The array camera 100 may include a plurality of camera modules 121, a display unit 151, a storage unit 160, and a controller 180. Of course, the array camera 100 may further include other components as needed. For example, the array camera 100 may further include a user input unit (not shown) to receive a user manipulation input and an interface unit (not shown) for connection with other electrical devices.

In actual implementation, two or more of these components may be incorporated into a single component or one component may be configured separately as two or more components as needed.

Meanwhile, the camera modules 121 of the array camera 100 according to this embodiment of the present invention may include a plurality of camera modules 121a, 121b, 121c, . . . which may be independently controlled. Various well-known camera modules may be used as the respective camera modules 121a, 121b, 121c, . . . .

Each of the camera modules 121a, 121b, 121c, . . . may include a lens unit 122 and a camera sensor 123.

Light condensed through the lens unit 122, i.e. an image of a subject photographed by a user, may be formed on the corresponding camera sensor 123. The camera sensor 123 may convert an external image input through the lens unit 122 into image data. For example, the camera sensor 123 may be a charge coupled device (CCD) sensor or a complementary metal oxide semiconductor (CMOS) sensor, which converts an input image into an electronic signal. However, embodiments of the present invention are not limited thereto.

Meanwhile, the camera sensor 123 may have a mode to photograph general video and a mode to photograph high-speed or superhigh-speed video. Alternatively, the camera sensor 123 may have a photographing mode to which setting of an arbitrary frame rate may be applied.

Meanwhile, the lens unit 122 may include a plurality of lenses.

Resolution is increased in proportion to the diameter of a lens. When the diameter of the lens is large, therefore, it is advantageous in terms of resolution. However, focal distance is increased with the result that miniaturization and slimming of the camera module may be difficult.

On the other hand, when the diameter of the lens is small, it is advantageous in terms of miniaturization and slimming of the camera module. However, it may be difficult to acquire an image of high resolution and high quality.

In the array camera 100 according to this embodiment of the present invention, a plurality of images acquired by the camera modules is composed to acquire an image of high quality. Consequently, relatively small lenses may be used. Consequently, miniaturization and slimming of the camera module may be possible.

Meanwhile, in this embodiment of the present invention, the lens unit 122 of at least one of the camera modules may include a lens having a different kind, magnifying power, and size from the other camera modules.

The controller 180 may control overall operation of the array camera 100 and receive image data from the respective camera modules 121 to perform an image processing operation.

Meanwhile, referring to FIG. 3, the controller 180 may include a processor 181 to control overall operation of the controller 180, an image processing unit 182 to process data received from the camera modules 121, a composition unit 183 to compose a plurality of still images or videos, and a post-processing unit 184 to perform a processing operation for display or storage of a composed still image or video.

The image processing unit 182 may convert analog image data input from the camera sensor 123 into digital image data.

For example, the camera sensor 123 may photograph a subject to acquire an image frame, which is electrical analog image data. The image frame may include a plurality of pixels and information per pixel. During conversion into the digital image data, the image processing unit 182 may process the information per pixel.

The image processing unit 182 may perform image processing, such as color correction, color enhancement, and gamma correction, for image quality improvement.

Meanwhile, the composition unit 183 may perform main image processing, such as image interpretation processing, image recognition processing, and image effect processing, under control of the processor 181. For the image recognition processing, the composition unit 183 may perform object extraction, region extraction, face recognition, scene recognition processing, etc. In addition, the composition unit 183 may compose a plurality of still images.

Meanwhile, the composition unit 183 may be provided in the processor 181.

Meanwhile, the display unit 151 may display an operation state of the array camera, a manipulation screen, etc.

In addition, the display unit 151 may receive display data from the controller 180 and display a final image or a preview image.

Alternatively, the display unit 151 may display an input image of a predetermined one of the camera modules 121, for example the camera module 121a, as a preview image according to setting.

Meanwhile, the controller 180 may control at least two of the camera modules 121 to be used as a stereoscopic camera that may three-dimensionally recognize a subject.

In addition, the controller 180 may process a plurality of still images acquired through the camera modules to generate a depth map. The depth map may be used as reference data for more effective image composition as well as generation of a three-dimensional (3D) image.

In this embodiment of the present invention, the controller 180 may distinguish objects from still image data using a well-known still image analysis method. At least one of edge, size, color, brightness, and motion characteristics of objects included in a plurality of still images may be analyzed. These parameters may correspond to depth cues.

In addition, color, brightness, definition, and motion characteristics, such as presence and size of image motion, of objects and a background may also be confirmed.

In addition, a precedence relationship between objects may be distinguished. A precedence relationship between objects which are displayed on a single screen although not overlapping as well as overlapping objects may be used in setting of a depth value given during conversion of a two-dimensional (2D) image into a 3D image or may be used in image composition.

The depth cues are factors determining perspective inherent in a 2D image. The controller 180 may generate a depth map based on the depth cue.

For example, static ones of the depth cues may include texture gradient, linear perspective, atmospheric perspective, and shading. On the other hand, dynamic ones of the depth cues may include motion parallax and kinetic depth effect.

Meanwhile, the controller 180 may control the camera modules to automatically focus on different objects.

Meanwhile, the controller 180 may extract objects from a plurality of still images. For example, as shown in FIG. 4, a person 41, a golf club 42, a golf ball 43, and a background 44 may be extracted from a plurality of still images acquired as shown in an example of FIG. 1. The controller 180 may compose the extracted objects to generate a composed still image as shown in FIG. 5.

In addition, the generated depth map may be referred in composition of the objects.

Alternatively, the controller 180 may select focal points from a plurality of still images, generate a depth map, and compose a plurality of still images based on the generated depth map.

Alternatively, various other image composition methods, such as high dynamic range (HDR), may be used.

Meanwhile, the controller 180 of FIG. 3 is illustrative. The respective components of the controller 180 may not be provided in the controller 180 but may be provided separately outside the controller 180. Alternatively, the controller 180 may be realized by a program.

In addition, two or more of the components of the controller 180 may be incorporated into a single component or one component may be configured separately as two or more components as needed. The controller 180 may further include at least one component which is not shown in the example of FIG. 3.

Meanwhile, the storage unit 160 may store a program necessary to operate the array camera and acquired data. In addition, the array camera may include a buffer to temporarily store data as needed.

FIG. 6 is a block diagram of a mobile terminal 200 according to an embodiment of the present invention.

A mobile terminal as described in this specification may include a mobile phone, a smartphone, a laptop computer, a digital broadcasting terminal, a personal digital assistant (PDA), a portable multimedia player (PMP), a camera, a navigation system, a tablet computer, and an electronic book (e-book) terminal.

The mobile terminal 200 according to the embodiment of the present invention will hereinafter be described with reference to FIG. 6 in terms of functional components of the mobile terminal.

Referring to FIG. 6, the mobile terminal 200 may include a wireless communication unit 210, an audio/video (A/V) input unit 220, a user input unit 230, a sensing unit 240, an output unit 250, a memory 260, an interface unit 270, a controller 280, and a power supply unit 290. In actual implementation, two or more of these components may be incorporated into a single component or one component may be configured separately as two or more components as needed. For example, a camera 221, particularly an array camera, may be provided in the A/V input unit 220. Alternatively, the array camera may be provided separately from the A/V input unit 220.

The wireless communication unit 210 may include a broadcast reception module 211, a mobile communication module 213, a wireless Internet module 215, a local area communication module 217, and a global positioning system (GPS) module 219.

The broadcast reception module 211 receives a broadcast signal and/or broadcast-related information from an external broadcast management server through a broadcast channel. The broadcast channel may include a satellite channel, a terrestrial channel, etc. The broadcast management server may be a server that generates and transmits a broadcast signal and/or broadcast-related information or a server that receives a generated broadcast signal and/or generated broadcast-related information and transmits the generated broadcast signal and/or the generated broadcast-related information to a terminal.

The broadcast signal may not only include a TV broadcast signal, a radio broadcast signal, and a data broadcast signal but also a broadcast signal in which a data broadcast signal is combined with a TV broadcast signal or a radio broadcast signal. The broadcast-related information may be information related to a broadcast channel, a broadcast program, or a broadcast service provider. The broadcast-related information may also be provided over a mobile communication network. In this case, the broadcast-related information may be received by the mobile communication module 213. The broadcast-related information may be provided in various forms.

The broadcast reception module 211 receives a broadcast signal using a variety of broadcast systems. Specifically, the broadcast reception module 211 may receive a digital broadcast signal using a digital broadcast system, such as digital multimedia broadcasting-terrestrial (DMB-T), digital multimedia broadcasting-satellite (DMB-S), media forward link only (MediaFLO), digital video broadcast-handheld (DVB-H), or integrated services digital broadcast-terrestrial (ISDB-T). In addition, the broadcast reception module 211 may be adapted not only to such a digital broadcast system but also to any other broadcast system that provides a broadcast signal. A broadcast signal and/or broadcast-related information received through the broadcast reception module 211 may be stored in the memory 260.

The mobile communication module 213 transmits and receives a wireless signal to and from at least one selected from a group consisting of a base station, an external terminal, and a server over a mobile communication network. The wireless signal may include a voice call signal, a video conversation call signal, or various types of data associated with transmission and reception of a text/multimedia message.

The wireless Internet module 215 is a module for wireless Internet access. The wireless Internet module 215 may be provided inside or outside the mobile terminal 200. The wireless Internet module 215 may use wireless Internet technology, such as wireless LAN (WLAN) (Wi-Fi), wireless broadband (WiBro), world interoperability for microwave access (WiMAX), or high speed downlink packet access (HSDPA).

The local area communication module 217 is a module for local area communication. The local area communication module 217 may employ Bluetooth, radio frequency identification (RFID), infrared data association (IrDA), ultra wideband (UWB), ZigBee, or near field communication (NFC) as local area communication technology.

The global positioning system (GPS) module 219 receives location information from a plurality of GPS satellites.

The audio/video (A/V) input unit 220 is provided to input an audio signal or a video signal. The A/V input unit 220 may include a camera 221 and a microphone 223. The camera 221 processes an image frame, such as a still image or video, obtained through an image sensor in an image capture mode or a video conversation mode. The processed image frame may be displayed on a display unit 251.

Meanwhile, the camera 221 may be an array camera including a plurality of camera modules which may be independently controlled and acquire images.

Meanwhile, the image frame processed by the camera 221 may be stored in the memory 260 or may be transmitted to an external device through the wireless communication unit

210. Two or more cameras 221 may be provided according to embodiments of the mobile terminal 200. For example, the cameras 221 may be provided at the front and the rear of the mobile terminal 200. In this case, at least one of the front and rear cameras 221 may be an array camera. In particular, the rear camera may be an array camera to acquire an image of high quality.

The microphone 223 receives an external sound signal in a voice talk mode, a voice recording mode, or a voice recognition mode and processes the received sound signal into electrical voice data. In the voice talk mode, the processed voice data may be converted and output in a form transmittable to a mobile communication base station through the mobile communication module 213. A variety of noise removal algorithms may be used to remove noise generated in the course of receiving an external sound signal through the microphone 223.

The user input unit 230 generates key input data corresponding to a key input operation that a user has performed to control the operation of the mobile terminal. The user input unit 230 may include a keypad, a dome switch, or a (resistive/capacitive) touchpad, which is used to input a command or information according to user push or touch manipulation. Alternatively, the user input unit 230 may include a jog wheel to rotate a key, a joystick, or a finger mouse. In a case in which the touchpad constitutes a layered structure with the display unit 251, which will hereinafter be described, the touchpad may be referred to as a touchscreen.

The sensing unit 240 detects a current state of the mobile terminal 200, such as whether the mobile terminal 200 is open or closed, where the mobile terminal 200 is located, or whether or not the user has contacted the mobile terminal 200, and generates a sensing signal to control the operation of the mobile terminal 200. For example, in a case in which the mobile terminal 200 is a slide phone, the sensing unit 240 may sense whether the mobile terminal 200 has been slid open or closed. In addition, the sensing unit 240 may also be responsible for sensing functions associated with whether or not power is supplied to the power supply unit 290 or whether or not the interface unit 270 is coupled to an external device.

The sensing unit 240 may include a proximity sensor 241, a pressure sensor 243, and a motion sensor 245. The proximity sensor 241 may detect presence or absence of an object that is approaching or in the vicinity of the mobile terminal 200 without physical contact. The proximity sensor 241 may detect a nearby object based on change in AC magnetic fields or change in magnetostatic fields or based on a variation rate of capacitance. In addition, the proximity sensor 241 may detect which side of the mobile terminal 200 a user is holding. Two or more proximity sensors 241 may be provided according to embodiments of the mobile terminal 200.

The pressure sensor 243 may detect whether pressure is applied to the mobile terminal 200 and the magnitude of such pressure in a case in which the pressure has been applied to the mobile terminal 200. The pressure sensor 243 may be mounted at a region of the mobile terminal 200 at which it may be necessary to detect pressure according to use environment.

In a case in which the pressure sensor 243 is mounted at the display unit 251, it may be possible to distinguish between touch input performed through the display unit 251 and pressure touch input performed by pressure greater than that of the touch input according to a signal output from the pressure sensor 243. In addition, it may be possible to confirm the magnitude of pressure applied to the display unit 251 when pressure touch input is performed according to the signal output from the pressure sensor 243.

On the other hand, in a case in which the pressure sensor 243 is mounted outside the mobile terminal 200, the proximity sensor 241 may detect pressure to confirm which side of the mobile terminal 200 a user is holding.

The motion sensor 245 detects position or motion of the mobile terminal 200 using an acceleration sensor or a gyro sensor. The acceleration sensor, which may be used in the motion sensor 245, is a device that converts change of acceleration in one direction into an electric signal. Acceleration sensors have become increasingly widespread with development of micro-electromechanical system (MEMS) technology.

A variety of acceleration sensors are available, ranging from an acceleration sensor mounted in an air bag system of a vehicle to measure a large acceleration value to detect collision to an acceleration sensor that recognizes minute operation of a user's hand to measure a small acceleration value as in a game controller. The acceleration sensor may be configured to measure acceleration in two or three spatial dimensions. In some cases, an acceleration sensor which measures only Z-axis acceleration may be utilized. In a case in which an X-axis or Y-axis acceleration sensor is used instead of a Z-axis acceleration sensor for certain applications, an additional piece type substrate may be used such that the acceleration sensor is mounted in a main substrate in an erect state.

The gyro sensor is a kind of sensor to measure angular velocity. The gyro sensor may detect a direction of the mobile terminal rotated relative to a reference direction.

Meanwhile, the sensing unit 240 may include sensors for user authentication. For example, in a case in which user authentication is performed through biometric information of a user, a sensor to recognize body temperature, fingerprint, iris, and face of the user may be provided. In addition, a sensor necessary according to a user authentication method set in the mobile terminal 200 may be provided.

The output unit 250 is provided to output an audio signal, a video signal, or an alarm signal. The output unit 250 may include a display unit 251, a sound output module 253, an alarm unit 255, and a haptic module 257.

The display unit 251 displays information processed by the mobile terminal 200. For example, in a case in which the mobile terminal 200 is in a voice talk mode, the display unit 251 displays a conversation-related user interface (UI) or graphical user interface (GUI). In a case in which the mobile terminal 200 is in a video conversation mode or an image capture mode, the display unit 251 may individually or simultaneously display captured or received images. In addition, the display unit 251 may display a corresponding UI or GUI.

In a case in which the display unit 251 forms a layered structure together with the touchpad so as to constitute a touchscreen as described above, the display unit 251 may not only be used as an output device but may also be used as an input device to input information through user touch.

In a case where the display unit 251 is configured as a touchscreen, the display unit 251 may include a touchscreen panel, a touchscreen panel controller, etc. In this case, the touchscreen panel may be a transparent panel mounted to the exterior of the mobile terminal 200. The touchscreen panel may be connected to an internal bus of the mobile terminal 200. The touchscreen panel monitors touches and sends, upon detecting touch input, corresponding signals to the touchscreen panel controller. The touchscreen panel controller processes the signals and transmits corresponding data to the controller 280. The controller 280 determines whether or not touch input has occurred and which region of the touchscreen has been touched.

The display unit 251 may include electronic paper (e-paper). The electronic paper (e-paper) is a reflective display unit exhibiting high resolution, a wide viewing angle, and excellent viewing characteristics based on a bright white background like conventional paper and ink. The electronic paper (e-paper) may be formed on any substrate, such as plastic, metal, or paper. Even after the electronic paper (e-paper) is turned off, a screen state of the electronic paper (e-paper) is maintained. In addition, a backlight power supply is not required and, therefore, the mobile terminal 200 may have an extremely long battery time. A hemispherical twist ball filled with electrostatic charges, an electrophoretic display, or a microcapsule may be used to produce electronic paper.

In addition, the display unit 251 may include at least one selected from among a liquid crystal display unit, a thin film transistor-liquid crystal display unit, an organic light-emitting diode unit, a flexible display unit, and a three-dimensional display (3D display) unit. Furthermore, two or more display units 251 may be provided according to embodiments of the mobile terminal 200. For example, the mobile terminal 200 may include both an external display unit (not shown) and an internal display unit (not shown).

The sound output module 253 outputs audio data received from the wireless communication unit 210 or stored in the memory 260 when the mobile terminal 200 is in an incoming call mode, a voice talk mode, a voice recording mode, a voice recognition mode, or a broadcast reception mode. In addition, the sound output module 253 outputs audio signals associated with functions performed by the mobile terminal 200, for example a sound signal associated with an incoming call sound or a message received sound. The sound output module 253 may include a speaker, a buzzer, etc.

The alarm unit 255 outputs a signal notifying the user that an event has occurred in the mobile terminal 200. Examples of events occurring in the mobile terminal 200 include incoming call reception, message reception, and key signal input. The alarm unit 255 outputs a signal notifying the user of the occurrence of an event in a form different from an audio signal or a video signal. For example, the alarm unit 255 may output a notification signal through vibration. When an incoming call signal is received or when a message is received, the alarm unit 255 may output a signal indicating the incoming call signal or reception of the message. In addition, when a key signal is input, the alarm unit 255 may output a feedback signal to the key signal input. The user may thus perceive event occurrence through the signal output from the alarm unit 255. The signal indicating the event occurrence in the mobile terminal 200 may also be output through the display unit 251 or the sound output module 253.

The haptic module 257 generates a variety of tactile effects which the user may sense. One typical example of a tactile effect that may be generated by the haptic module 257 is vibration. In a case in which the haptic module 257 generates vibration as a tactile effect, the haptic module 257 may change an intensity and pattern of generated vibration. In addition, the haptic module 257 may combine different vibrations and output the combined vibrations, or may sequentially output different vibrations.

In addition to vibration, the haptic module 257 may generate various tactile effects, such as a stimulus effect obtained by arranging pins that move perpendicularly to the touched skin surface, a stimulus effect obtained by air blowing or suction through an air outlet or inlet, a stimulus effect obtained through brushing of the skin surface, a stimulus effect obtained through contact with an electrode, a stimulus effect obtained by using electrostatic force, and a stimulus effect obtained through reproduction of thermal (cool/warm) sensation using an endothermic or exothermic element. The haptic module 257 may be embodied so as to allow the user to perceive such effects not only through direct tactile sensation but also through kinesthetic sensation of fingers, arms, etc. of the user. Two or more haptic modules 257 may be provided according to embodiments of the mobile terminal 200.

The memory 260 may store a program based on which the controller 280 performs processing and control operations. In addition, the memory 260 may temporarily store input or output data items (for example, a phonebook, a message, a still image, video, etc.).

The memory 260 may include at least one selected from among a flash memory type memory, a hard disk type memory, a multimedia card micro type memory, a card type memory (for example, an SD or XD memory), a random access memory (RAM), and a read-only memory (ROM). In addition, the mobile terminal 200 may utilize web storage that performs a storage function of the memory 260 over the Internet.

The interface unit 270 functions to interface with all external devices connected to the mobile terminal 200. Examples of the external devices connected to the mobile terminal 200 include a wired/wireless headset, an external battery charger, a wired/wireless data port, a memory card, a card socket such as a subscriber identification module (SIM) card socket or a user identity module (UIM) card socket, an audio input/output (I/O) terminal, a video I/O terminal, and an earphone. The interface unit 270 may receive power or data from such an external device and provide the same to each internal component of the mobile terminal 200. In addition, the interface unit 270 may transmit internal data of the mobile terminal 200 to the external device.

When the mobile terminal 200 is connected to an external cradle, the interface unit 270 may be used as a channel through which the connected cradle supplies power to the mobile terminal 200 or a channel through which a variety of command signals input to the cradle by the user are transferred to the mobile terminal 200.

The controller 280 generally controls the operation of each component to control overall operation of the mobile terminal 200. For example, the controller 280 performs control and processing associated with voice conversation, data communication, video conversation, etc. The controller 280 may include a multimedia playback module 281 for multimedia reproduction. The multimedia playback module 281 may be configured as hardware in the controller 280 or may be configured as software that is provided separately from the controller 280.

Under control of the controller 280, the power supply unit 290 receives external power or internal power and supplies power required for operation to each component.

The mobile terminal 200 with the above-stated construction may be configured to operate in a communication system utilizing frame or packet based transmission, including a wired/wireless communication system and a satellite-based communication system.

Meanwhile, in a case in which the camera 221 of the mobile terminal 200 is the array camera 100, it may not be necessary for the mobile terminal 200 to further include all of the components of the array camera 100 described with reference to FIG. 3 and all of the components of the array camera 100 may be replaced by the components of the mobile terminal 200.

For example, the mobile terminal 200 includes the display unit 251. As long as an additional display unit is provided as needed, therefore, it may not be necessary for the mobile terminal 200 to further include an additional display unit to display an operation state of the array camera 100, a manipulation screen, a preview image, and a final view image.

That is, the controller 180, the display unit 151, and the storage unit 160 of the array camera 100 may be replaced by the controller 280, the display unit 251, and the storage unit 260 of the mobile terminal 200. In addition, the mobile terminal 200 including the array camera according to the embodiment of the present invention may operate according to the operating method described with reference to FIGS. 1 to 5.

FIG. 7 is a front perspective view of the mobile terminal according to the embodiment of the present invention and FIG. 8 is a rear perspective view of the mobile terminal shown in FIG. 7. Hereinafter, the mobile terminal according to the present invention will be described with reference to FIGS. 7 and 8 in terms of structural components of the mobile terminal. In the following description, a bar type mobile terminal having a front touchscreen will be described as an example for the convenience of description. However, embodiments of the present invention are not limited to such a bar type mobile terminal. For example, embodiments of the present invention may be applied to other types of mobile terminals, such as a folder type mobile terminal, a swing type mobile terminal, and a slide type mobile terminal.

Referring to FIG. 7, a case forming the external appearance of the mobile terminal 200 includes a front case 200-1 and a rear case 200-2. Various electronic components are mounted in a space defined between the front case 200-1 and the rear case 200-2.

At a main body of the mobile terminal 200, specifically at the front case 200-1, may be disposed a display unit 251, a first sound output module 253a, a first camera 221a, and first to third user input units 230a, 230b, and 230c. At one side of the rear case 200-2 may be disposed a fourth user input unit 230d, a fifth user input unit 230e, and a microphone 223.

A touchpad may overlap the display unit 251 in a layered structure such that the display unit 251 may be operated as a touchscreen through which information may be input by user touch.

The first sound output module 253a may be embodied as a receiver or a speaker. The first camera 221a may be embodied to appropriately photograph a still image or video of the user. The microphone 223 may be embodied to appropriately receive voice of the user or other sounds.

The first to fifth user input units 230a, 230b, 230c, 230d, and 230e and sixth and seventh user input units 230f and 230g, which will hereinafter be described, may be simply referred to as a user input unit 230. Types of the user input unit 230 are not particularly restricted as long as the user input unit 230 may be operated in a tactile manner in which the user manipulates the user input unit 230 through touch.

For example, the user input unit 230 may be embodied as a dome switch or a touchpad which receives a command or information through user manipulation, such as push or touch. Alternatively, the user input unit 230 may be embodied as a wheel, a jog wheel or a joystick which may rotate a key. In a functional aspect, the first to third user input units 230a, 230b, and 230c are provided to input commands, such as start, stop, and scroll, and the fourth user input unit 230d is provided to select operation modes. In addition, the fifth user input unit 230e may serve as a hot key to activate special functions of the mobile terminal 200.

Referring to FIG. 8, a second camera 221b may be mounted at the rear of the rear case 200-2. Sixth and seventh user input units 230f and 230g and an interface unit 270 may be disposed at one side of the rear case 200-2.

The second camera 221b may have a photographing direction substantially opposite to that of the first camera 221a. In addition, the second camera 221b may have a different resolution than the first camera 221a. A flash (not shown) and a mirror (not shown) may be further disposed in the vicinity of the second camera 221b.

In addition, another camera may be further mounted in the vicinity of the second camera 221b to photograph a three-dimensional stereoscopic image.

Meanwhile, at least one of the first and second cameras 221a and 221b may be an array camera including a plurality of camera modules and may photograph a three-dimensional stereoscopic image. In particular, the second camera 221b may be an array camera.

In a case in which a subject is photographed using the second camera 221b, the flash emits light to the subject. In a case in which a user wishes to photograph (self-photograph) his or her own image using the second camera 221b, the mirror may enable the user to look at his or her face.

A second sound output module (not shown) may be further disposed at the rear case 200-2. The second sound output module may output sound in stereo together with the first sound output module 253a. Alternatively, the second sound output module may be used for conversation in a speakerphone mode.

The interface unit 270 may be used as a channel through which the mobile terminal 200 may exchange data with an external device. In addition to an antenna for voice talk, a broadcast signal receiving antenna (not shown) may be disposed at a region of the front case 200-1 and a region of the rear case 200-2. The antenna may be mounted in the rear case 200-2 such that the antenna is withdrawn from the rear case 200-2.

The power supply unit 290 to supply power to the mobile terminal 200 may be mounted to the rear case 200-2. The power supply unit 290 may be, for example, a rechargeable battery. For charging, the power supply unit 290 may be removed from the rear case 100-2.

Meanwhile, in this embodiment, the second camera 221b is disposed at the rear case 200-2; however, embodiments of the prevent invention are not limited thereto.

In addition, the second camera 221b may be omitted so long as the first camera 221a is configured to be rotatable such that the first camera 221a may photograph an image in any direction, even that of the second camera 221b.

FIG. 9 is a flowchart showing the method for operating the array camera according to the embodiment of the present invention and FIGS. 10a to 13 are views illustrating various examples of the method for operating the mobile terminal of FIG. 9.

First, the array camera acquires images through a plurality of camera modules (S910).

Referring to FIG. 3, the array camera includes a plurality of camera modules 121a, 121b, 121c, . . . .

The respective camera modules 121a, 121b, 121c, . . . may output sensing signals including image signals photographed by the respective camera sensors 123. The output sensing signals may be input to the image processing unit 182.

FIG. 13 is a view exemplarily showing an example of sensing signals.

Referring to FIG. 13, camera sensors 1310a, 1310b, . . . , and 1310c in the respective camera modules include pixel arrays 1320a, . . . to acquire photographed images, timing controllers 1340a, . . . to drive the pixel arrays, and interface units 1330a, . . . to transmit sensing signals 1300 including the acquired photographed images to the outside of the modules.

Meanwhile, each of the sensing signals 1300 output from the respective camera sensors 1310a, 1310b, . . . , and 1310c may include synchronization information 1305a, identifier information 1305b, and an image signal 1305c.

Meanwhile, the interface unit 1330a of one of the camera modules may receive all of the sensing signals output from the respective camera modules. As shown in FIG. 13, all of the sensing signals are input to the interface unit 1330a of the first camera sensor 1310a of the first camera module. Consequently, the respective sensing signals may be efficiently managed. Particularly when data are transmitted to the image processing unit 182, the number of data lines for data transmission may be considerably reduced.

Meanwhile, since all of the sensing signals 1300 are received by the interface unit 1330a of one camera sensor 1310a, the sensing signals 1300 may include identifier information per camera module as shown in the drawing. Consequently, the sensing signals for the respective modules may be distinguished.

Meanwhile, since the respective camera sensors 1310a, 1310b, . . . , and 1310c sequentially output the sensing signals 1300, the sensing signals may include synchronization information 1305a to distinguish between the respective sensing signals.

Meanwhile, the interface unit 1330a of the first camera sensor 1310a may extract an image signal 1305c from the sensing signal 1300. Particularly since the interface unit 1330a of the first camera sensor 1310a receives all of the sensing signals, the interface unit 1330a of the first camera sensor 1310a may extract image signals from the respective sensing signals. The extracted image signals may be sorted by module and then composed.

Consequently, image signals which have been sorted per module and sequentially composed may be input to the image processing unit 182.

Meanwhile, the image processing unit 182 may image signal process the received image signals. For example, the image processing unit 182 may convert input analog image data into digital image data.

Subsequently, when a first object is located at a first position or a first distance (S915), the array camera extracts a first image and a second image acquired by the first camera module and the second camera module, respectively (S920). In addition, the array camera calculates distance information regarding the first object based on the extracted first image and second image (S930).

Subsequently, the processor 181 determines whether the first object is located at the first position or the first distance based on the image signals photographed by the respective camera modules. Upon determining that the first object is located at the first position or the first distance, the processor 181 extracts the first image and the second image acquired by the first camera module and the second camera module.

Referring to FIG. 11a, in a case in which a first object 1110a is located at a first distance D1, respective camera modules A1, . . . , and A4 of an array camera 1010 may acquire photographed images of the first object 1110a.

FIG. 11b(a) exemplarily shows a photographed image 1120a acquired by the first camera module A1 and FIG. 11b(b) exemplarily shows a photographed image 1120b acquired by the second camera module A2.

As shown in FIG. 11a, the first camera module A1 and the second camera module A2 are disposed at a central part of the array camera 1010. In a case in which the distance from the object is short, i.e. in a case in which the first object 1110a is located at the first distance D1 as shown in FIG. 11a, images photographed by the first camera module A1 and the second camera module A2 may be used.

For example, in a case in which the first object 1110a is located at the first distance D1 as shown in FIG. 11a, a predetermined value or more of a disparity between the first object 1110a in the image photographed by the first camera module A1 and the first object 1110a in the image photographed by the second camera module A1 is generated although a distance L1 between the first camera module A1 and the second camera module A2 is short. Consequently, distance measurement using such a disparity may be possible.

In another example, in a case in which a second object 1110b is located at a second distance D2 as shown in FIG. 11a, a predetermined value or more of a disparity between the second object 1110b in the image photographed by the first camera module A1 and the second object 1110b in the image photographed by the second camera module A1 is not generated since the arrangement distance L1 between the first camera module A1 and the second camera module A2 is short. Consequently, distance measurement using such a disparity may be inaccurate.

In this embodiment of the present invention, therefore, distance measurement is performed using only images photographed by specific ones of the camera modules according to the distance from the object or the position of the object.

Meanwhile, the processor 181 may decide by which camera modules images, which will be used, have been photographed in consideration of distances from the respective camera modules to an object.

The processor 181 may decide by which camera modules images, which will be used, have been photographed in consideration of at least one selected from among sizes of images of an object in images acquired by the respective camera modules A1, . . . , and A4, a position of the object in the acquired images, and a disparity of the object between the acquired images.

For example, in a case in which an object is located at a short distance, i.e. the size of an image of the object is equal to or greater than a predetermined value, the processor 181 may decide distance measurement using images photographed by neighboring ones of the camera modules.

In another example, in a case in which an object is located at a long distance, i.e. the size of an image of the object is less than the predetermined value, the processor 181 may decide distance measurement using images photographed by widely spaced ones of the camera modules.

That is, in a case in which the first object 1110a is located at the first distance D1 as shown in FIG. 11a, the processor 181 measures the distance from the first object 1110a using the photographed image 1120a acquired by the first camera module A1 and the photographed image 1120b acquired by the second camera module A2.

Specifically, the processor 181 may finally calculate the distance D1 from the first object 1110a using a disparity Da between an object image 1130a in the photographed image 1120a acquired by the first camera module A1 and an object image 1132a in the photographed image 1120b acquired by the second camera module A1.

Meanwhile, upon determining at step 915 (S915) that the first object is not located at the first position or the first distance, step 940 (S940) and subsequent steps may be performed.

That is, when a second object is located at a second position or a second distance (S940), the array camera extracts a third image and a fourth image acquired by the third camera module and the fourth camera module, respectively (S945). In addition, the array camera calculates distance information regarding the second object based on the extracted third image and fourth image (S950).

In a case in which the second object 1110b is located at the second distance D2 as shown in FIG. 11a, the processor 181 may measure the distance from the second object 1110b using the third camera module A3 and the fourth camera module A4, the arrangement distance between which is L2.

That is, as shown in FIG. 11c, the processor 181 may measure the distance from the second object 1110b using a photographed image 1120c acquired by the third camera module A3 and a photographed image 1120d acquired by the fourth camera module A4.

Specifically, the processor 181 may finally calculate the distance D2 from the second object 1110b using a disparity Db between an object image 1130b in the photographed image 1120c acquired by the third camera module A3 and an object image 1132b in the photographed image 1120d acquired by the fourth camera module A4.

Meanwhile, the first object 1110a and the second object 1110b may be the same although the first object 1110a and the second object 1110b are different from each other in FIG. 11a.

That is, in a case in which the first object 1110a is located at the first distance D1, distance measurement using only images photographed by the first and second camera modules A1 and A2 may be possible. On the other hand, in a case in which the first object 1110a is located at the second distance D2, distance measurement using only images photographed by the third and fourth camera modules A3 and A4 may be possible.

As described above, it may be determined by which camera modules images, which will be used, have been photographed particularly based on the distance from the object and, therefore, it may be possible to appropriately confirm the distance from the object.

FIGS. 12a to 12c are views exemplarily showing that camera modules to be used are changed depending upon the position of an object or the distance from the object.

First, referring to FIG. 12a, in a case in which the first object 1110a is located at the first distance D1, the processor 181 may measure the distance from the first object 1110a using the first camera module A1 and the second camera module A2, the arrangement distance between which is L1.

That is, as shown in FIG. 11b, the processor 181 may measure the distance from the first object 1110a using the photographed image 1120a acquired by the first camera module A1 and the photographed image 1120b acquired by the second camera module A2.

On the other hand, in a case in which the second object 1110b is located at a third distance D3 as shown in FIG. 12a, the processor 181 may measure the distance from the second object 1110b using the second camera module A2 and the third camera module A3, the arrangement distance between which is L3.

Meanwhile, the third distance D3 and the arrangement distance L3 shown in FIG. 12a may be less than the second distance D2 and the arrangement distance L2 shown in FIG. 11a.

As the distance from the object is increased, it may be possible to measure the distance from the object using two camera modules, the distance between which is increased, as described above.

Meanwhile, the first object 1110a and the second object 1110b may be the same although the first object 1110a and the second object 1110b are different from each other in FIG. 12a.

Next, referring to FIG. 12b, in a case in which the first object 1110a is located at the first distance D1, the processor 181 may measure the distance from the first object 1110a using the first camera module A1 and the second camera module A2, the arrangement distance between which is L1.

On the other hand, in a case in which the second object 1110b is located at a fourth distance D4 as shown in FIG. 12b, the processor 181 may measure the distance from the second object 1110b using the second camera module A2 and the third camera module A3, the arrangement distance between which is L3.

Upon comparison between FIGS. 12b and 12a, the arrangements of the camera modules A1, A2, A3, and A4 of the array camera 1010 are different from each other. Such different arrangements of the camera modules A1, A2, A3, and A4 are provided to explain that camera modules to be selected are changed depending upon the position of the object. The arrangements of the camera modules A1, A2, A3, and A4 are substantially the same except that reference symbols of the camera modules are changed.

Meanwhile, the first object 1110a and the second object 1110b may be the same although the first object 1110a and the second object 1110b are different from each other in FIG. 12b.

Next, referring to FIG. 12c, in a case in which both the first object 1110a and the second object 1110b are located at the first distance D1, the processor 181 may measure the distance from the first object 1110a located at a first position using the first camera module A1 and the second camera module A2 and the distance from the second object 1110b located at a second position using the third camera module A3 and the fourth camera module A4 based on the positions of the first object 1110a and the second object 1110b In this case, the arrangement distance between the first camera module A1 and the second camera module A2 is L1 and the arrangement distance between the third camera module A3 and the fourth camera module A4 is L1.

Upon comparison between FIGS. 12c and 12a, the arrangements of the camera modules A1, A2, A3, and A4 of the array camera 1010 are different from each other. Such different arrangements of the camera modules A1, A2, A3, and A4 are provided to explain that camera modules to be selected are changed depending upon the position of the object. The arrangements of the camera modules A1, A2, A3, and A4 are substantially the same except that reference symbols of the camera modules are changed.

Meanwhile, the first object 1110a and the second object 1110b may be the same although the first object 1110a and the second object 1110b are different from each other in FIG. 12c.

Meanwhile, the method for operating the array camera as shown in FIG. 9 may be applied to various electrical devices. In a case in which an electrical device includes the array camera with the above-stated construction, the array camera may acquire the image at step 910 (S910) and steps 915 to 950 (S915 to S950) may be performed by a controller or a processor of the electrical device.

For example, in a case in which the camera 221 of FIG. 6 is the array camera, images photographed by the respective camera modules may be input to the controller 280 and the distance from a corresponding object may be calculated using only some of the images.

Meanwhile, FIGS. 10a to 10b are views exemplarily showing that array cameras according to embodiments of the present invention are provided and operated in various electrical devices.

An array camera 1010 of FIG. 10a is provided in an image display device 1000, such as a television, and array cameras 1060a and 1060b of FIG. 10b are provided in the vicinity of front headlights of a vehicle 1060.

The image display device 1000 of FIG. 10a and the vehicle 1060 of FIG. 10b may perform the operation method of FIG. 9 as described above.

Meanwhile, in a case in which the distance from an object is calculated using an array camera, an electrical device including the array camera may perform corresponding operations using the calculated distance from the object.

For example, in a case in which the image display device 1000 of FIG. 10a is an image display device, to which a gesture may be input, the distance from a user and a user's gesture may be confirmed through the array camera 1010. The controller of the image display device may determine whether the user's gesture is a predetermined one in consideration of the face of the user and positions of the hands of the user.

Specifically, in a case in which a user takes a gesture of raising both hands, the array camera 1010 may photograph the user gesture and a controller (not shown) may determine the distance from the user and whether the user gesture is a predetermined gesture based on the photographed gesture. In a case in which the gesture of raising both hands is set to trigger display of an object for channel volume control, an object for channel volume control may be displayed on a display unit of the image display device 1000.

At this time, the size and luminance of the object may be changed based on the distance from the user. Specifically, when the distance from the user is increased, the size and/or the luminance of the object may be increased to secure visibility of the object. On the other hand, when the distance from the user is decreased, the size and/or the luminance of the object may be decreased to secure visibility of the object.

That is, the size or the luminance of an image, an on screen display (OSD), a menu, or an electronic program guide (EPG) screen displayed on the image display device 1000 may be changed based on the distance from the user.

Meanwhile, in a case in which the image display device 1000 is an image display device that displays a 3D image, the depth of a 3D image to be displayed may be adjusted based on the distance from the user. For example, when the distance from the user is increased, a disparity between a left eye image and a right eye image to be displayed is increased to enhance a three-dimensional effect such that the depth of the 3D image is increased.

On the other hand, the image display device 1000 is a non-glasses type image display device that displays a 3D image, arrangement of multi viewpoint images may be changed based on the distance from the user. Consequently, it may be possible to see the non-glasses type multi viewpoint images in response to the distance from the user.

Meanwhile, in a case in which the distances from the users are the same but the positions of the users are different as shown in FIG. 12c, positions of an object, a menu, or an OSD displayed on the image display device 1000 may be changed.

For example, in a case in which a user is located at the right side of the image display device 1000, an object, a menu, or an OSD may be displayed on the right side of the display unit in response to the location of the user.

Meanwhile, distances from plural users may be accurately calculated. In a case in which any of the users takes a gesture, therefore, the image display device 1000 that recognizes the gesture may display a menu for the corresponding user based on the user gesture. Consequently, user convenience may be improved.

On the other hand, in a case in which the electrical device is a vehicle 1050 as shown in FIG. 10b, a corresponding operation may be performed using the distance from an object calculated based on images photographed by the array cameras 1060a and 1060b.

For example, since the distance from a front object may be accurately calculated using the array cameras 1060a and 1060b, a warning message for the front object may be output. Alternatively, the front object may be photographed with high resolution. Consequently, photographed images of high quality may be acquired and recorded.

In another example, since the distance from the front object may be accurately calculated using the array cameras 1060a and 1060b, lamp output directions of the front lamps may be accurately controlled.

FIG. 14 is a flowchart showing a method for operating an array camera according to another embodiment of the present invention.

Referring to FIG. 14, the array camera receives sensing signals output from a plurality of camera modules (S1410).

Referring to FIG. 13, camera sensors 1310a, 1310b, . . . , and 1310c in the respective camera modules include pixel arrays 1320a, . . . to acquire photographed images, timing controllers 1340a, . . . to drive the pixel arrays, and interface units 1330a, . . . to transmit sensing signals 1300 including the acquired photographed images to the outside of the modules.

Meanwhile, each of the sensing signals 1300 output from the respective camera sensors 1310a, 1310b, . . . , and 1310c may include synchronization information 1305a, identifier information 1305b, and an image signal 1305c.

Meanwhile, the interface unit 1330a of one of the camera modules may receive all of the sensing signals output from the respective camera modules. As shown in FIG. 13, all of the sensing signals are input to the interface unit 1330a of the first camera sensor 1310a of the first camera module. Consequently, the respective sensing signals may be efficiently managed. Particularly when data are transmitted to the image processing unit 182, the number of data lines for data transmission may be considerably reduced.

Meanwhile, since all of the sensing signals 1300 are received by the interface unit 1330a of one camera sensor 1310a, the sensing signals 1300 may include identifier information per camera module as shown in the drawing. Consequently, the sensing signals for the respective modules may be distinguished from one another.

Since the sensing signals for the respective modules are distinguished from one another as described above, the identifier information may be used in a case in which the distance from the object is calculated using any ones of the images acquired by the camera modules.

Alternatively, since the sensing signals for the respective modules are distinguished from one another as described above, the identifier information may be used in a case in which a composite signal is acquired using any ones of the images acquired by the camera modules.

Meanwhile, group information for grouping the respective camera modules may be used in addition to the identifier information per camera module.

Meanwhile, since the respective camera sensors 1310*a*, 1310*b*, . . . , and 1310*c* sequentially output the sensing signals 1300, the sensing signals may include synchronization information 1305*a* to distinguish between the sensing signals.

Subsequently, the array camera extracts image signals corresponding to the respective camera modules from the received sensing signals (S1420).

Meanwhile, the interface unit 1330*a* of the first camera sensor 1310*a* of FIG. 13 may extract an image signal 1305*c* from the sensing signal 1300. Particularly since the interface unit 1330*a* of the first camera sensor 1310*a* receives all of the sensing signals, the interface unit 1330*a* of the first camera sensor 1310*a* may extract image signals from the respective sensing signals.

Subsequently, the array camera sequentially composes the extracted image signals per camera module (S1430).

The image signals extracted by the interface unit 1330*a* of the first camera sensor 1310*a* may be sorted by module and then composed.

Consequently, image signals which have been sorted per module and sequentially composed may be input to the image processing unit 182.

Meanwhile, the image processing unit 182 may image process the received image signals. For example, the image processing unit 182 may convert input analog image data into digital image data.

The array camera, the electrical device, and the method for operating the same according to the present invention are not limitedly applied to the construction and method of the embodiments as previously described; however, all or some of the embodiments may be selectively combined to achieve various modifications.

Meanwhile, the operation method of the mobile terminal according to the present invention may be realized as a code, which is readable by a processor included in mobile terminal, in recording media readable by the processor. The recording media readable by the processor includes all kinds of recording devices to store data which are readable by the processor. Examples of the recording media readable by the processor may include a read only memory (ROM), a random access memory (RAM), a compact disc read only memory (CD-ROM), a magnetic tape, a floppy disk, and an optical data storage device. In addition, the recording media readable by the processor may also be realized in the form of a carrier wave, such as transmission through the Internet. Furthermore, the recording media readable by the processor may be distributed to computer systems connected to each other through a network such that a code readable by the processor is stored or executed in a distribution manner.

Those skilled in the art to which the present invention pertains will appreciate that the present invention may be carried out in other specific ways than those set forth herein without departing from the technical ideas and essential characteristics of the present invention. The above embodiments are therefore to be construed in all aspects as illustrative and not restrictive. The scope of the invention should be determined by the appended claims, not by the above description, and all changes and modifications derived from the meaning and scope of the appended claims and their equivalents are intended to be embraced therein.

Mode for the Invention

Various embodiments of a virtual golf simulation apparatus and method have been described in the best mode for carrying out the invention.

INDUSTRIAL APPLICABILITY

According to an embodiment of the present invention, an array camera including a plurality of camera modules acquires images through the camera modules and calculates the distance from an object using the image acquired by a corresponding one of the camera modules based on the position of the object or the distance from the object. As a result, the distance from the object may be conveniently and correctly confirmed, thereby improving user convenience. Consequently, the present invention has industrial applicability.

The invention claimed is:

1. A method for operating an array camera comprising a plurality of camera modules, the method comprising:
   acquiring images through the camera modules;
   when a size of a first object present in the acquired images is equal to or greater than a predetermined size, extracting a first image acquired by a first camera module and a second image acquired by a second camera module, the first camera module and the second camera module being two adjacent camera modules selected from among the plurality of camera modules;
   calculating first distance information regarding the first object based on the first image and the second image; and
   when a size of a second object present in the acquired images is less than the predetermined size, extracting a third image acquired by a third camera module and a fourth image acquired by a fourth camera module, the third camera module and the fourth camera module being two spaced apart camera modules selected from among the plurality of camera modules;
   calculating second distance information regarding the second object based on the third image and the fourth image.

2. The method according to claim 1, wherein the first and second camera modules are located between the third and fourth camera modules.

3. The method according to claim 2, wherein a first distance between the first camera module and the second camera module is less than a second distance between the third camera module and the fourth camera module.

4. The method according to claim 1, wherein the second distance information is calculated using a disparity between the second object in the third image and the second object in the fourth image.

5. The method according to claim 1, wherein a first distance between the first camera module and the second camera module is less than a second distance between the third camera module and the fourth camera module.

6. The method according to claim 1, wherein the first object and the second object are the same.

7. The method according to claim 1, wherein extracting the first image comprises separating a first image signal from a first sensing signal output from the first camera module.

8. The method according to claim 1, wherein the first distance information regarding the first object is calculated based on a disparity between the first object in the first image and the first object in the second image.

9. A method for operating an electrical device having an array camera comprising a plurality of camera modules, the method comprising:
acquiring images through the camera modules;
when a size of a first object present in the acquired images is equal to or greater than a predetermined size, extracting a first image acquired by a first camera module and a second image acquired by a second camera module, the first camera module and the second camera module being two adjacent camera modules selected from among the plurality of camera modules;
calculating first distance information regarding the first object based on the first image and the second image; and
when a size of a second object present in the acquired images is less than the predetermined size, extracting a third image acquired by a third camera module and a fourth image acquired by the forth camera module, the third camera module and the fourth camera module being two spaced apart camera modules selected from among the plurality of camera modules;
calculating second distance information regarding the second object based on the third image and the forth image.

10. An array camera comprising:
a plurality of camera modules; and
a controller configured to:
receive signals output from the plurality of camera modules extract each image signal respectively corresponding to one of the plurality of camera modules from the received signals;
compose extracted image signals respectively corresponding to the plurality of camera modules per frame;
when a size of a first object present in images acquired through the plurality of camera modules is equal to or greater than a predetermined size, extract a first image acquired by a first camera module and a second image acquired by a second camera module, the first camera module and the second camera module being two adjacent camera modules selected from among the plurality of camera modules;
calculate first distance information regarding the first object based on the first image and the second image;
when a size of a second object present in the acquired images is less than the predetermined size, extract a third image acquired by a third camera module and a fourth image acquired by a forth camera module, the third camera module and the fourth camera module being two spaced apart camera modules selected from among the plurality of camera modules; and
calculate second distance information regarding the second object based on the third image and the forth image.

11. The array camera according to claim 10, wherein the first and second camera modules are located between the third and fourth camera modules.

12. The array camera according to claim 10, wherein a first distance between the first camera module and the second camera module is less than a second distance between the third camera module and the fourth camera module.

13. The array camera according to claim 10, wherein each of the camera modules comprises:
a pixel array to acquire a photographed image; and
an interface to transmit a sensing signal comprising the acquired photographed image to an outside of the module, and wherein one of the camera modules receives the signals output from the respective camera modules.

14. The array camera according to claim 13, wherein the signal comprises synchronization information, identifier information, and the image signal.

15. An electrical device comprising:
a plurality of camera modules; and
a controller configured to:
receive signals output from the plurality of camera modules;
extract each image signal respectively corresponding to one of the plurality of camera modules from the received signals;
compose extracted image signals respectively corresponding to the plurality of camera modules per frame;
when a size of a first object present in images acquired through the plurality of camera modules is equal to or greater than a predetermined size, extract a first image acquired by a first camera module and a second image acquired by a second camera module, the first camera module and the second camera module being two adjacent camera modules selected from among the plurality of camera modules;
calculate first distance information regarding the first object based on the first image and the second image;
when a size of a second object present in the acquired images is less than the predetermined size, extract a third image acquired by a third camera module and a fourth image acquired by a forth camera module, the third camera module and the fourth camera module being two spaced apart camera modules selected from among the plurality of camera modules; and
calculate second distance information regarding the second object based on the third image and the forth image.

16. The method according to claim 1, wherein acquiring the images comprises:
receiving signals output from the plurality of camera modules;
extracting each image signal respectively corresponding to one of the plurality of camera modules from the received signals; and
composing extracted image signals respectively corresponding to the plurality of camera modules per frame,
wherein the signal comprises identifier information per camera module for distinguishing from one another, the image signals, synchronization information for distinguish timing between the signals, and group information for grouping the respective camera modules.

* * * * *